United States Patent
Peil et al.

(10) Patent No.: US 10,150,251 B2
(45) Date of Patent: Dec. 11, 2018

(54) CONNECTING SYSTEMS FOR ADJACENT ENDS OF INSULATION TUBING

(71) Applicant: Aeroflex USA, Inc., Sweetwater, TN (US)

(72) Inventors: Darrell Peil, Rock Hill, SC (US); Brad Steverson, Lenlor City, TN (US); Greg Ertel, Clinton, TN (US)

(73) Assignee: Aeroflex USA, Sweetwater, TN (US)

(*) Notice: Subject to any disclaimer, the term of this patent is extended or adjusted under 35 U.S.C. 154(b) by 316 days.

(21) Appl. No.: 15/174,420

(22) Filed: Jun. 6, 2016

(65) Prior Publication Data

US 2016/0319984 A1 Nov. 3, 2016

Related U.S. Application Data

(63) Continuation-in-part of application No. 14/984,533, filed on Dec. 30, 2015, which is a
(Continued)

(51) Int. Cl.
*B29C 65/50* (2006.01)
*B32B 7/06* (2006.01)
(Continued)

(52) U.S. Cl.
CPC .......... *B29C 66/5221* (2013.01); *B29C 65/50* (2013.01); *B29C 65/5014* (2013.01);
(Continued)

(58) Field of Classification Search
CPC . B29C 65/50; B29C 65/5014; B29C 65/5021; B29C 65/5028; B29C 65/5042;
(Continued)

(56) References Cited

U.S. PATENT DOCUMENTS

| 1,063,458 | A | 6/1913 | McBee |
| 4,114,655 | A | 9/1978 | Bloker |

(Continued)

FOREIGN PATENT DOCUMENTS

| DE | G 90 06 975.7 | 10/1990 |
| ES | 1063458 | 4/2006 |
| GB | 1397477 | 6/1975 |

*Primary Examiner* — Michael A Tolin
(74) *Attorney, Agent, or Firm* — Pitts & Lake, P.C.

(57) ABSTRACT

A connector or adhesive assembly for joining adjacent ends of insulation tubing, comprising a layer of pressure-sensitive transfer adhesive material, said layer of pressure-sensitive transfer adhesive material capable of bonding to insulation tubing, whereby when said layer of pressure-sensitive transfer adhesive material is positioned between a first section of insulation tubing and a second section of insulation tubing, said layer of pressure-sensitive transfer adhesive material bonds to both the first section of insulation tubing and the second section of insulation tubing; and a disposable release liner member adapted to hold said layer of pressure-sensitive transfer adhesive material prior to positioning said layer of pressure-sensitive transfer adhesive material between the first section of insulation tubing and the second section of insulation tubing. Generally, the seam created when the first section of insulation tubing and the second section of insulation tubing are joined is covered with tape.

4 Claims, 8 Drawing Sheets

Related U.S. Application Data continuation-in-part of application No. 13/774,497, filed on Feb. 22, 2013.

(51) Int. Cl.

| | | |
|---|---|---|
| *B32B 7/12* | (2006.01) | |
| *C09J 7/40* | (2018.01) | |
| *F16L 13/10* | (2006.01) | |
| *F16L 59/14* | (2006.01) | |
| *B29C 65/00* | (2006.01) | |
| *B29D 23/00* | (2006.01) | |
| *B32B 25/04* | (2006.01) | |
| *B32B 27/06* | (2006.01) | |
| *B32B 1/08* | (2006.01) | |
| *F16L 59/02* | (2006.01) | |
| *F16L 59/16* | (2006.01) | |
| *B29L 23/00* | (2006.01) | |

(52) U.S. Cl.
CPC ...... *B29C 65/5057* (2013.01); *B29C 66/1142* (2013.01); *B29D 23/003* (2013.01); *B32B 1/08* (2013.01); *B32B 7/06* (2013.01); *B32B 7/12* (2013.01); *B32B 25/04* (2013.01); *B32B 27/06* (2013.01); *C09J 7/40* (2018.01); *F16L 13/103* (2013.01); *F16L 59/028* (2013.01); *F16L 59/14* (2013.01); *B29C 65/5071* (2013.01); *B29L 2023/00* (2013.01); *B29L 2023/225* (2013.01); *B32B 2307/206* (2013.01); *B32B 2307/304* (2013.01); *B32B 2435/00* (2013.01); *F16L 59/166* (2013.01); *Y10T 156/1052* (2015.01); *Y10T 156/17* (2015.01); *Y10T 428/1452* (2015.01); *Y10T 428/1462* (2015.01); *Y10T 428/1476* (2015.01)

(58) Field of Classification Search
CPC ............ B29C 65/5057; B29C 65/5064; B29C 65/5071; B29C 66/1142; B29C 66/5221; B29D 23/003; B29L 2023/225; B32B 1/08; B32B 5/024; B32B 7/06; B32B 7/12; B32B 2307/304; B32B 2435/00; C09J 7/10; C09J 7/20; C09J 7/21; C09J 7/38; C09J 7/383; C09J 7/385; C09J 7/40; F16L 13/103; F16L 59/022; F16L 59/028; F16L 59/14; F16L 59/166; F16L 59/20; Y10T 428/14; Y10T 428/1452; Y10T 428/1462; Y10T 428/1476; Y10T 428/149; Y10T 428/1495

See application file for complete search history.

(56) References Cited

U.S. PATENT DOCUMENTS

| | | |
|---|---|---|
| 4,748,060 A | 5/1988 | Fry et al. |
| 4,842,908 A | 6/1989 | Cohen et al. |
| 4,857,371 A | 8/1989 | McClintock |
| 5,141,793 A | 8/1992 | Fontanilla |
| 5,190,798 A | 3/1993 | Block |
| 6,162,534 A | 12/2000 | Hamerski |
| 6,403,180 B1 | 6/2002 | Barrall |
| 6,736,430 B1 | 5/2004 | Meulemans et al. |
| 6,823,899 B2 | 11/2004 | Weibel et al. |
| 6,902,784 B2 | 7/2005 | Princell et al. |
| 6,972,568 B2 | 12/2005 | Haner et al. |
| 8,178,197 B2 | 5/2012 | Segur |
| 8,318,280 B2 | 11/2012 | Deiss |
| 2002/0061380 A1 | 5/2002 | Corpus |
| 2008/0081138 A1 | 4/2008 | Moore |
| 2010/0151771 A1 | 6/2010 | Vitoorapakom |
| 2014/0239632 A1* | 8/2014 | Steverson ........... B29C 65/5064 285/285.1 |

* cited by examiner

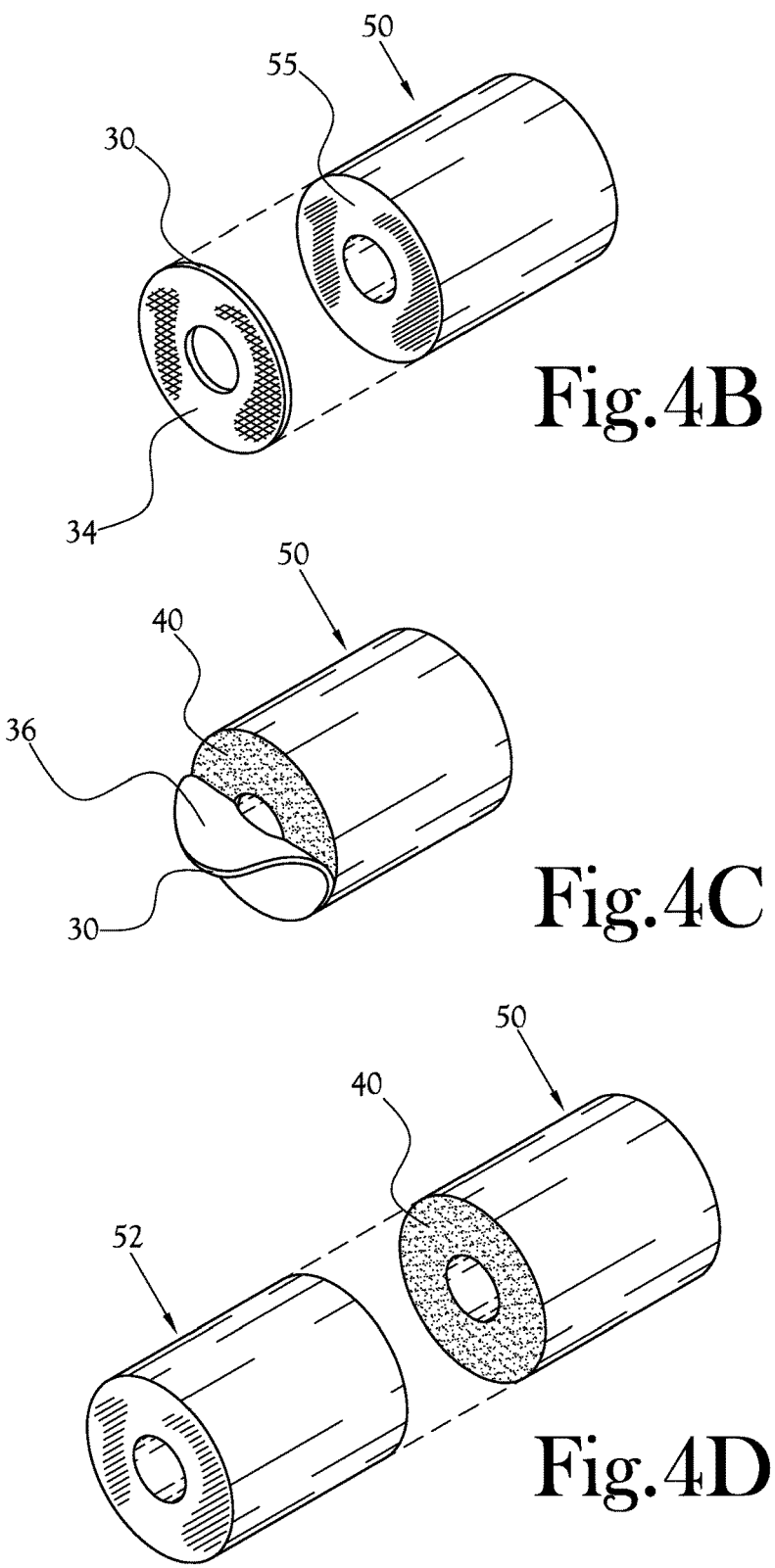

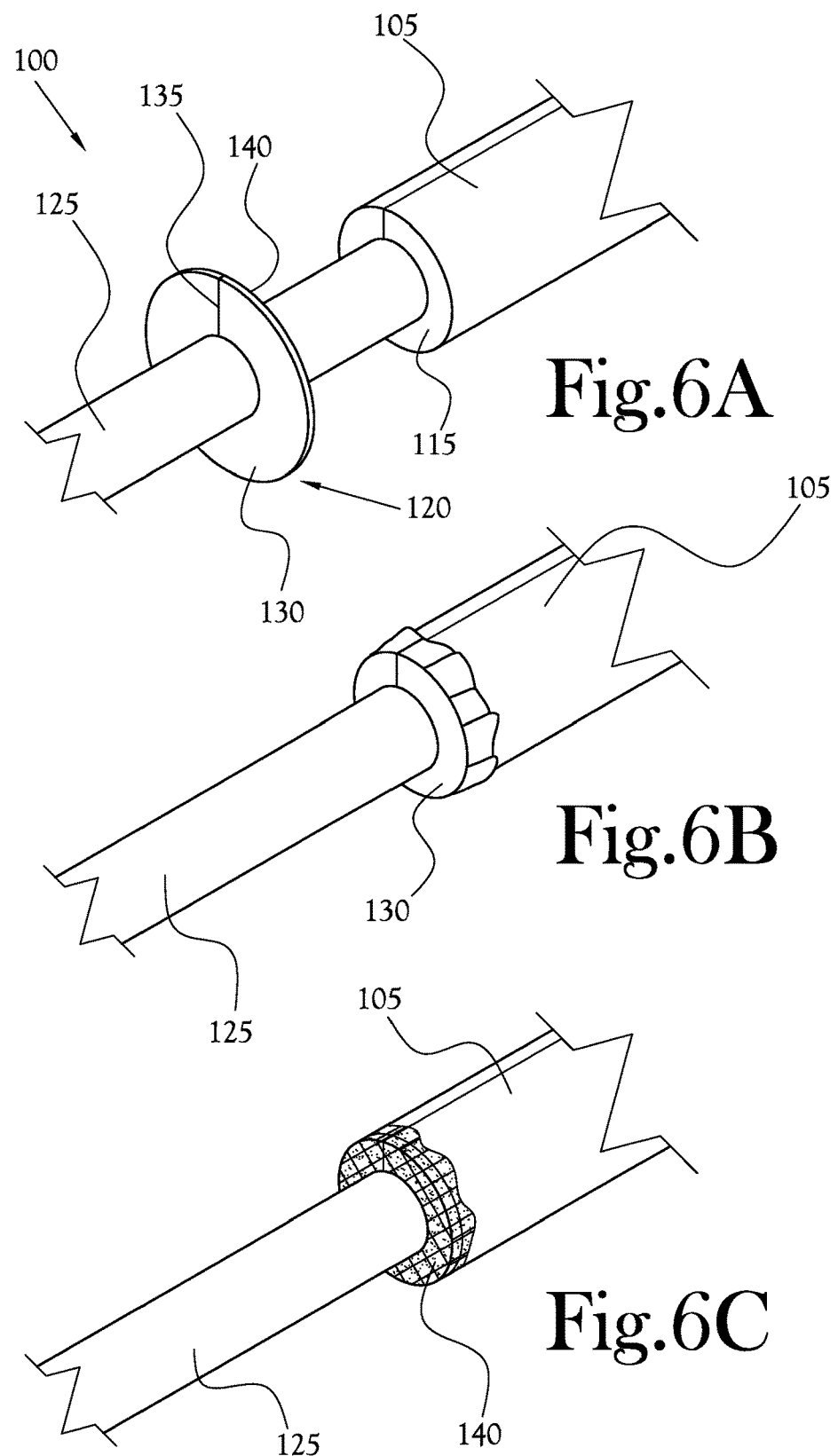

CONNECTING SYSTEMS FOR ADJACENT ENDS OF INSULATION TUBING

CROSS-REFERENCE TO RELATED APPLICATIONS

This application is a continuation-in-part of U.S. patent application Ser. No. 14/984,533, filed Dec. 30, 2015, which is a continuation-in-part of U.S. patent application Ser. No. 13/774,497, filed Feb. 22, 2013. The entire content of both of the foregoing applications is incorporated herein by reference.

STATEMENT REGARDING FEDERALLY SPONSORED RESEARCH OR DEVELOPMENT

Not Applicable

BACKGROUND OF THE INVENTION

1. Field of Invention

The present invention relates generally to systems and methods for joining adjacent ends of sections of insulation tubing.

2. Description of the Related Art

Insulation for pipes is known in the art. Insulation tubing is used for pipes and fittings that convey steam, hot materials, condensate, lubricants, cryogenic fluids and cold materials typically used in heating and air conditioning, power facilities, food processing facilities and petrochemical facilities. Thus, insulation tubing is employed in a wide array of industrial applications, such as boilers and petrochemical plants, and for a variety of purposes, including, for example, condensation control and energy conservation (e.g., minimizing thermal leakage).

Insulation tubing generally must be applied in sections. A problem arises of how to ensure a stable connection between two adjacent sections of insulation tubing.

U.S. Pat. No. 6,902,784, issued to Princell et al., discloses a pressure-sensitive adhesive insulation structure for joining two adjacent insulation structures. The pressure-sensitive insulation comprises a carrier having a first side and second side. A pressure-sensitive adhesive is in communication with the first side and in communication with the second side for adhering an insulation structure, such as those used to insulate piping. When used for joining two adjacent insulation structures, the carrier remains in place between the adjacent insulation structures.

BRIEF SUMMARY OF THE INVENTION

Example embodiments of the present general inventive concept can be achieved by providing a method of applying a pressure-sensitive transfer adhesive for connecting adjacent ends of insulation tubing, where this method includes fitting a first section of insulation tubing to a pipe, said piece of insulation tubing having at least one exposed end; peeling a first adhesive assembly away from a stack of adhesive assemblies, said adhesive assembly including a release liner member and a layer of pressure-sensitive transfer adhesive; attaching said adhesive assembly to the exposed end of the first section of insulation tubing; pulling the release liner member away from the tube, whereby said layer of pressure-sensitive transfer adhesive remains attached to the first section of insulation tubing; fitting a second section of insulation tubing to the pipe and bringing an end portion of second section of insulation tubing into contact with pressure-sensitive transfer adhesive attached to the first section of insulation tubing, whereby a seam is formed where the first section of insulation tubing is proximate the second section of insulation tubing; and covering the seam with tape.

In some embodiments, said layer of pressure-sensitive transfer adhesive material includes a scrim to reinforce the layer of pressure-sensitive transfer adhesive material.

In some embodiments, said layer of pressure-sensitive transfer adhesive material includes an acrylic-based pressure-sensitive transfer adhesive material.

In some embodiments, said layer of pressure-sensitive transfer adhesive material includes a rubber-based pressure-sensitive transfer adhesive material.

Example embodiments of the present general inventive concept can be achieved by providing a connector assembly for joining adjacent ends of insulation tubing, encompassing a layer of pressure-sensitive transfer adhesive material, said layer of pressure-sensitive transfer adhesive material capable of bonding to insulation tubing, whereby when said layer of pressure-sensitive transfer adhesive material is positioned between a first section of insulation tubing and a second section of insulation tubing, said layer of pressure-sensitive transfer adhesive material bonds to both the first section of insulation tubing and the second section of insulation tubing; a disposable release liner member adapted to hold said layer of pressure-sensitive transfer adhesive material prior to positioning said layer of pressure-sensitive transfer adhesive material between the first section of insulation tubing and the second section of insulation tubing, said disposable release liner member to be separated from said layer of pressure-sensitive transfer adhesive material after said layer of pressure-sensitive transfer adhesive material bonds to the first section of insulation tubing and before said layer of pressure-sensitive transfer adhesive material bonds the second section of insulation tubing; and a length of tape to cover a seam created when said layer of pressure-sensitive transfer adhesive material bonds the second section of insulation tubing.

In some embodiments, said layer of pressure-sensitive transfer adhesive material includes a scrim to reinforce the layer of pressure-sensitive transfer adhesive material.

In some embodiments, said layer of pressure-sensitive transfer adhesive material includes an acrylic-based pressure-sensitive transfer adhesive material.

In some embodiments, said layer of pressure-sensitive transfer adhesive material includes a rubber-based pressure-sensitive transfer adhesive material.

Generally, the layer of pressure-sensitive transfer adhesive material includes a pressure-sensitive transfer adhesive material fabricated from a pressure-sensitive polymer.

Additional features and embodiments of the present general inventive concept will be set forth in part in the description which follows and, in part, will be obvious from the description, or may be learned by practice of the general inventive concept.

The present invention in some of its embodiments includes a pressure-sensitive transfer adhesive and a disposable release liner member to hold the pressure-sensitive transfer adhesive. The release liner member and pressure-sensitive transfer adhesive are stacked on the non-adhesive-bearing side of another release liner member. The number of release liner members in a stack can be as many as two and higher. This stack allows for a peeling of one release liner member away from the stack of release liner members; the one release liner member is then attached to an end face of one section of insulation tubing (or tube). Once applied, the release liner is then pulled away from the tube, leaving an end face of tube with pressure-sensitive transfer adhesive attached to it. The release liner is then disposed of.

In some embodiments of the present general inventive concept, a system to join adjacent ends of insulation tubing comprises a stack of a connector assemblies, each connector assembly including a release liner member and a layer of pressure-sensitive transfer adhesive material, each said release liner member in said stack separated from adjacent release liner members in said stack by layers of pressure-sensitive transfer adhesive material, each said release liner member being coated with a layer of pressure-sensitive transfer adhesive material, such that when a release liner member is detached from said stack, said release liner member transports with itself a layer of pressure-sensitive transfer adhesive material, said layer of pressure-sensitive transfer adhesive material to bond to insulation tubing, whereby when said layer of pressure-sensitive transfer adhesive material is positioned between a first section of insulation tubing and a second section of insulation tubing, one side of said layer of pressure-sensitive transfer adhesive material bonds to the first section of insulation tubing and another side of said layer of pressure-sensitive transfer adhesive material bonds to the second section of insulation tubing. In some embodiments, said layer of pressure-sensitive transfer adhesive material includes a scrim to reinforce the layer of pressure-sensitive transfer adhesive material. In some embodiments, said layer of pressure-sensitive transfer adhesive material includes an acrylic-based pressure-sensitive transfer adhesive material. In some embodiments, said layer of pressure-sensitive transfer adhesive material includes a rubber-based pressure-sensitive transfer adhesive material.

Some embodiments of the present general inventive concept comprise a method of fabricating stacked connector assemblies to join adjacent ends of insulation tubing, said method comprising: supplying a plurality of sheets of release liner material; supplying a plurality of layers of pressure-sensitive transfer adhesive material; forming a laminar body comprising alternating sheets of release liner material and layers of pressure-sensitive transfer adhesive material; and cutting from said laminar body of a stack of release liner members and layers of pressure-sensitive transfer adhesive material, each said release liner member being coated with a layer of pressure-sensitive transfer adhesive material and each said release liner member in said stack separated from adjacent release liner members in said stack by layers of pressure-sensitive transfer adhesive material. In some embodiments, said layer of pressure-sensitive transfer adhesive material includes a scrim to reinforce the layer of pressure-sensitive transfer adhesive material. In some embodiments, said layer of pressure-sensitive transfer adhesive material includes at least one pressure-sensitive transfer adhesive material selected from the group consisting of an acrylic-based pressure-sensitive transfer adhesive material and a rubber-based pressure-sensitive transfer adhesive material.

Some embodiments of the present general inventive concept include a connector assembly to join adjacent ends of insulation tubing, comprising a release liner member coated with a layer of pressure-sensitive transfer adhesive material, said release liner member transporting with itself a layer of pressure-sensitive transfer adhesive material, said layer of pressure-sensitive transfer adhesive material to bond to insulation tubing, whereby when said layer of pressure-sensitive transfer adhesive material is positioned between a first section of insulation tubing and a second section of insulation tubing, one side of said layer of pressure-sensitive transfer adhesive material bonds to the first section of insulation tubing and another side of said layer of pressure-sensitive transfer adhesive material bonds to the second section of insulation tubing. In some embodiments, said layer of pressure-sensitive transfer adhesive material includes a scrim to reinforce the layer of pressure-sensitive transfer adhesive material. In some embodiments, said layer of pressure-sensitive transfer adhesive material includes an acrylic-based pressure-sensitive transfer adhesive material. In some embodiments, said layer of pressure-sensitive transfer adhesive material includes a rubber-based pressure-sensitive transfer adhesive material.

In some of the example embodiments, a stack of release liners, with inter-release liner layers of pressure-sensitive transfer adhesive material, facilitates the speedy and efficient application of layers of pressure-sensitive transfer adhesive material to join adjacent sections of insulation tubing. As each release liner is removed from the stack, said release liner transports with it a layer of pressure-sensitive transfer adhesive material, which is applied between two adjacent sections of insulation tubing. The pressure-sensitive transfer adhesive material adheres to the section of insulation tubing, and the remaining release liner is discarded. The next release liner in the stack is then ready to be removed from the stack, and the process of applying the layer of pressure-sensitive transfer adhesive material between two adjacent sections of insulation tubing is repeated. The stack configuration facilitates the quick application of pressure-sensitive transfer adhesive material.

In some embodiments, a method of applying a pressure-sensitive transfer adhesive for connecting adjacent ends of insulation tubing includes peeling a first release liner member away from a stack of release liner members, said first release liner member carrying a layer of pressure-sensitive transfer adhesive, attaching said first release liner member to an end face of a first section of insulation tubing, and pulling the release liner member away from the tube, whereby said layer of pressure-sensitive transfer adhesive remains attached to the end face of the first section of insulation tubing.

In some embodiments, said layer of pressure-sensitive transfer adhesive material includes a scrim to reinforce the layer of pressure-sensitive transfer adhesive material. In some embodiments, said layer of pressure-sensitive transfer adhesive material includes an acrylic-based pressure-sensitive transfer adhesive material. In some embodiments, said layer of pressure-sensitive transfer adhesive material includes a rubber-based pressure-sensitive transfer adhesive material.

BRIEF DESCRIPTION OF THE SEVERAL VIEWS OF THE DRAWINGS

The above-mentioned and additional features of the invention will become more clearly understood from the following detailed description of the invention read together with the drawings in which:

FIG. 4B is a view of another part of the process of applying a layer of pressure-sensitive transfer adhesive material according to the present general inventive concept, showing the orientation of the release liner proximate a section of insulation tubing;

FIG. 4C is a view of one part of the process of applying a layer of pressure-sensitive transfer adhesive material according to the present general inventive concept, showing the release liner being peeled away from the section of insulation tubing, leaving the layer of pressure-sensitive transfer adhesive material on the section of insulation tubing;

FIG. 4D is a view of one part of the process of applying a layer of pressure-sensitive transfer adhesive material according to the present general inventive concept, showing the joinder of two sections of insulation tubing with the layer of pressure-sensitive transfer adhesive material between them;

FIG. 6A is a perspective view of an example embodiment of an adhesive assembly including a disposable release liner and a layer of pressure-sensitive transfer adhesive material, showing the adhesive assembly being positioned on a pipe;

FIG. 6B is another perspective view of the example embodiment shown in FIG. 6A, showing the adhesive assembly pressed against the exposed end of a section of insulation tubing on a pipe;

FIG. 6C is another perspective view of the example embodiment shown in FIGS. 6A and 6B, showing the pressure-sensitive transfer adhesive material on the section of insulation tubing on a pipe after the release liner has been removed;

DETAILED DESCRIPTION OF THE INVENTION

Figure 1:
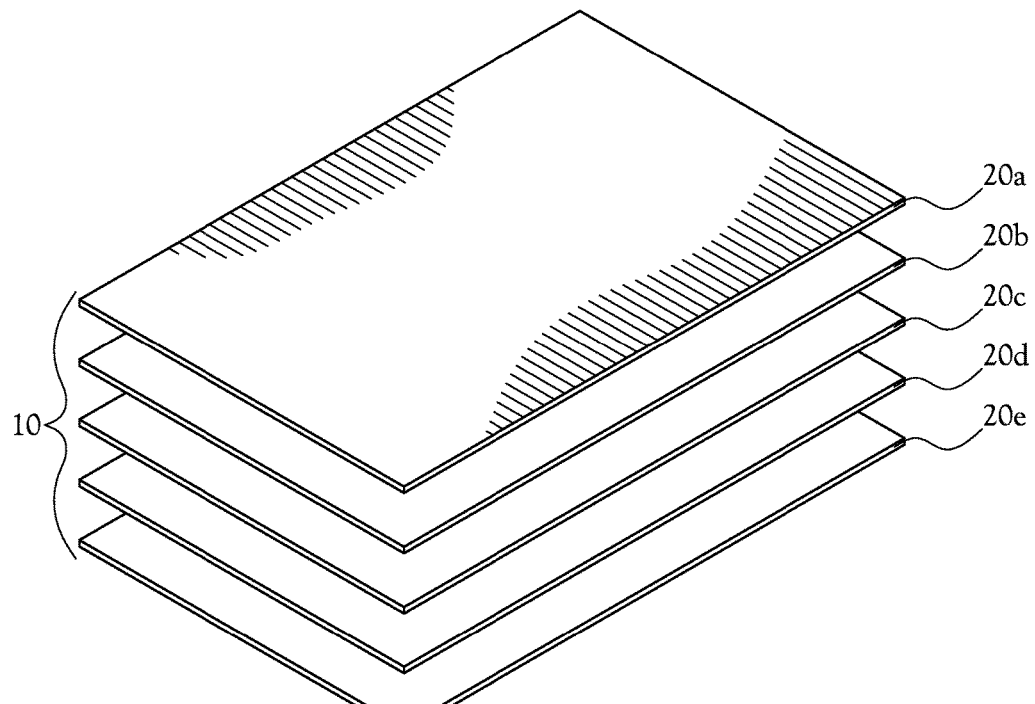
FIG. 1 is an exploded view of a laminar body including a plurality of sheets of release liner material coated with layers of pressure-sensitive transfer adhesive material.

The present invention in some of its embodiments is directed toward a system and method to make stacked connector assemblies for readily joining adjacent ends of sections of insulation tubing. Each of the stacked connector assemblies includes a release liner member having a central opening. A layer of pressure-sensitive transfer adhesive material is releasably attached to each side of the release liner member, such that one side of the layer of pressure-sensitive transfer adhesive material is able to bond to an end face of one section of insulation tubing, and the other side of the layer of pressure-sensitive transfer adhesive material is able to bond to an end face of the second section of insulation tubing.

In various embodiments, a connector or adhesive assembly for joining adjacent ends of insulation tubing encompasses a layer of pressure-sensitive transfer adhesive material, said layer of pressure-sensitive transfer adhesive material capable of bonding to insulation tubing, whereby when said layer of pressure-sensitive transfer adhesive material is positioned between a first section of insulation tubing and a second section of insulation tubing, said layer of pressure-sensitive transfer adhesive material bonds to both the first section of insulation tubing and the second section of insulation tubing; and a disposable release liner member adapted to hold said layer of pressure-sensitive transfer adhesive material prior to positioning said layer of pressure-sensitive transfer adhesive material between the first section of insulation tubing and the second section of insulation tubing. Generally, the seam created when the first section of insulation tubing and the second section of insulation tubing are joined is covered with tape.

In some of the several example embodiments, the present general inventive concept comprises a layer of viscous, pressure-sensitive adhesive (hereinafter generally "pressure-sensitive transfer adhesive") to position between adjacent ends of neighboring pieces of insulation tubing. In some embodiments, the layer of pressure-sensitive transfer adhesive includes a scrim that acts as a reinforcing structure to keep the layer of pressure-sensitive transfer adhesive material intact as a single body during and after application between two adjacent sections of insulation tubing.

Thus, in some of the several example embodiments, a connector assembly or adhesive assembly for joining adjacent ends of insulation tubing includes a layer of pressure-sensitive transfer adhesive material, said layer of pressure-sensitive transfer adhesive material capable of bonding to insulation tubing, whereby when said layer of pressure-sensitive transfer adhesive material is positioned between a first section of insulation tubing and a second section of insulation tubing, said layer of pressure-sensitive transfer adhesive material bonds to both the first section of insulation tubing and the second section of insulation tubing; and a disposable release liner member adapted to hold said layer of pressure-sensitive transfer adhesive material prior to positioning said layer of pressure-sensitive transfer adhesive material between the first section of insulation tubing and the second section of insulation tubing.

Reference will now be made to various example embodiments of the present general inventive concept, examples of which are illustrated in the accompanying drawings, wherein like reference numerals refer to like elements throughout. The following description of various embodiments is merely exemplary in nature and is in no way intended to limit the present general inventive concept, its application, or uses. The example embodiments are merely described below in order to explain the present general inventive concept by referring to the figures.

Figure 2:
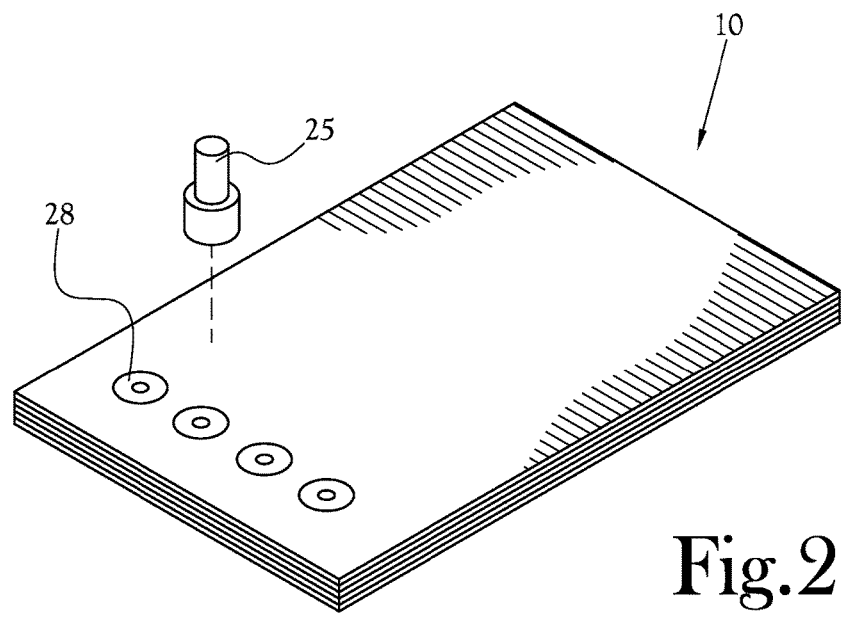
FIG. 2 is a perspective view of the laminar body shown in FIG. 1, showing stacks of release liner members and layers of pressure-sensitive transfer adhesive material being cut from the laminar body.
Figure 3:
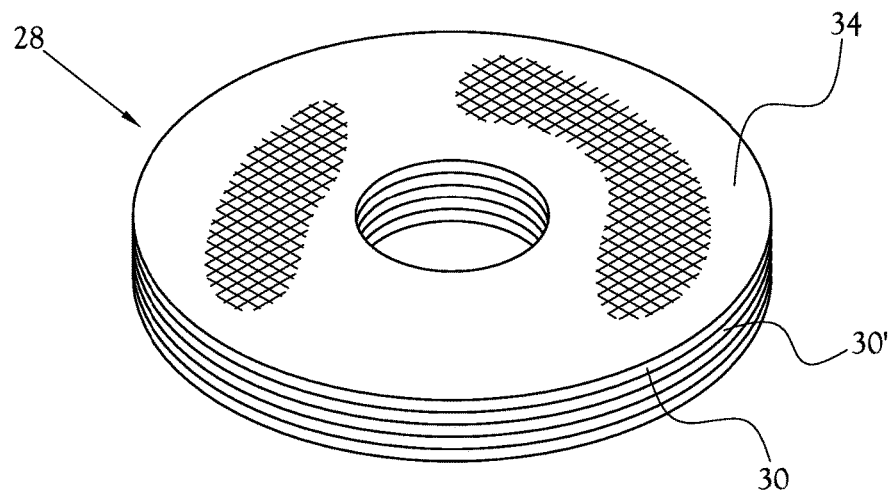
FIG. 3 is a perspective view of a stack of release liner members and layers of pressure-sensitive transfer adhesive material.

Turning to the Figures, FIG. 1 shows an exploded view of a laminate body involved in the manufacture of a stack of release liners according to one example embodiment of the present general inventive concept. As shown in FIG. 1, the laminate body 10 includes a plurality of sheet layers 20a-e of release liner material. Generally, a layer of pressure-sensitive transfer adhesive material is interposed between each sheet layer 20a-e, resulting in a laminar body 10 shown in FIG. 2. As shown in FIG. 2, in a subsequent phase of the manufacturing process, a punch 25 is used to carve from the laminar body a stack 28 of substantially disc-like release liner members with pressure-sensitive transfer adhesive material between each release liner member. FIG. 3 illustrates one example embodiment of a stack 28 of release liner members, each release liner member having a central opening; as a result of the manufacturing process, pressure-sensitive transfer adhesive material is positioned between each release liner member (for example, between the top-most release liner member 30 and the next release liner member 30' in the illustrated example embodiment). FIG. 3 further indicates an outboard or top-facing surface 34 of the top-most release liner member 30; generally, this outboard surface 34 is free of pressure-sensitive transfer adhesive material.

Although the Figures indicated above illustrate one example embodiment of a fabrication process for producing a laminate body according to the present general inventive concept, other fabrication processes and methods are contemplated and are encompassed by the present general inventive concept. The illustrated example embodiment shown in FIGS. 1-2 is not intended to be limiting, and should not be read as such.

Figure 4A:
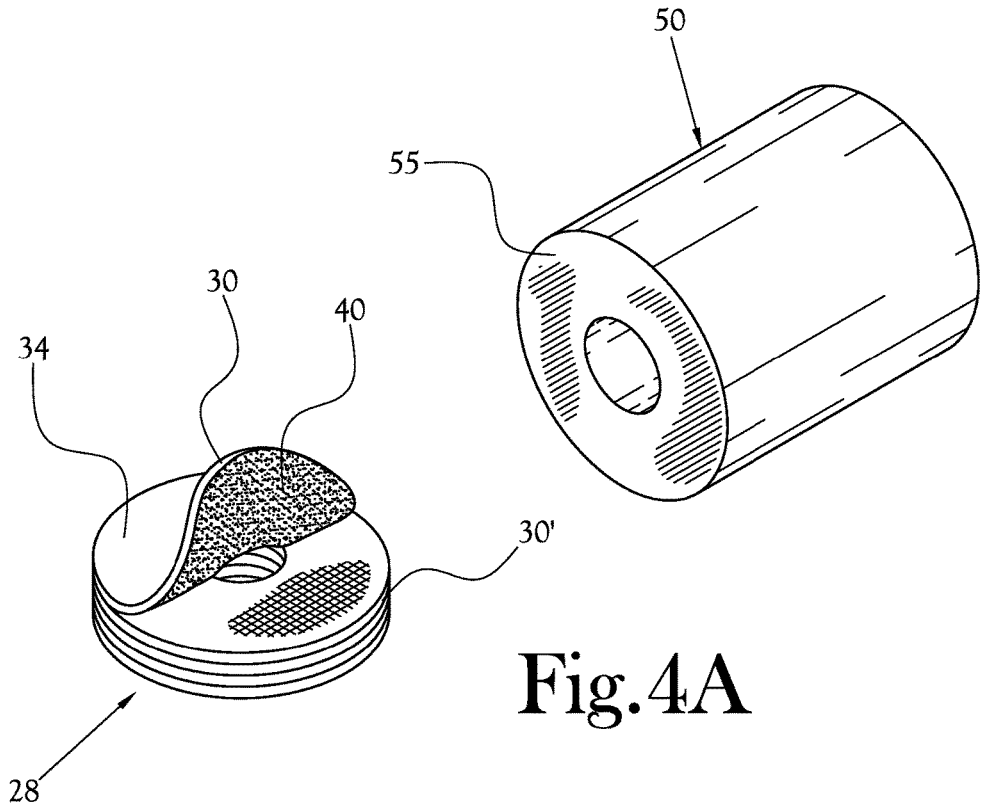
FIG. 4A is a view of one part of the process of applying a layers of pressure-sensitive transfer adhesive material according to the present general inventive concept, showing the detachment of one release liner and an attached layer of pressure-sensitive transfer adhesive material from the stack.

FIG. 4A through 4D illustrate one example embodiment of a method of using a release liner member with pressure-sensitive transfer adhesive material to apply pressure-sensitive transfer adhesive material to a section of insulation tubing. The illustrated example embodiment method also demonstrates some of the advantages of the present general inventive concept. As shown in FIG. 4A, the top-most or first release liner member 30 of the stack 28 is peeled away from the second release liner member 30' immediately below the first release liner member 30. When the first release liner member 30 is peeled away from the stack 28, a layer of pressure-sensitive transfer adhesive material 40 remains attached to the first release liner member 30; previous to the peeling away of the first release liner member 30 from the stack 28, the layer of pressure-sensitive transfer adhesive material 40 resided between the first release liner member 30 and the second release liner member 30'. Once the first release liner member 30 has been fully detached from the stack 28, the first release liner member 30 is moved into position near a section of insulation tubing 50, as shown in FIG. 4B. The section of insulation tubing 50 includes an end face 55, where the layer of pressure-sensitive transfer adhesive material 40 is to be applied. As shown in FIG. 4C, the first release liner 30 is abutted to the end face 55 of the section of insulation tubing 55, such that the layer of pressure-sensitive transfer adhesive material 40 substantially covers and is in physical contact with the end face 55. The first release liner 30 is then moved away from the end face 55 of the section of insulation tubing 50, while the layer of pressure-sensitive transfer adhesive material 40 remains deposited on the end face 55 of the section of insulation tubing 50. Next, as shown in FIG. 4D, a second section of insulation tubing 52 is moved into a position such that an end face of the second section of insulation tubing 52 is directly opposing and substantially adjacent to the end face 55 of the first section of insulation tubing 50, with the layer of pressure-sensitive transfer adhesive material 40 between the two end faces. The layer of pressure-sensitive transfer adhesive material 40 thereby adheres to the two proximate end faces of both sections of insulation tubing 50 and 52.

Thus, in the illustrated example embodiment, and in other example embodiments of the present general inventive concept, a stack of release liners, with inter-release liner layers of pressure-sensitive transfer adhesive material, facilitates the speedy and efficient application of layers of pressure-sensitive transfer adhesive material to join adjacent sections of insulation tubing. As each release liner is removed from the stack, said release liner transports with it a layer of pressure-sensitive transfer adhesive material, which is applied between two adjacent sections of insulation tubing. The next release liner in the stack is then ready to be removed from the stack, and the process of applying the layer of pressure-sensitive transfer adhesive material between two adjacent sections of insulation tubing is repeated. The stack configuration facilitates the quick application of pressure-sensitive transfer adhesive material. In various embodiments, release liners may be peeled from the top of the stack or from the bottom of the stack.

Figure 5A:
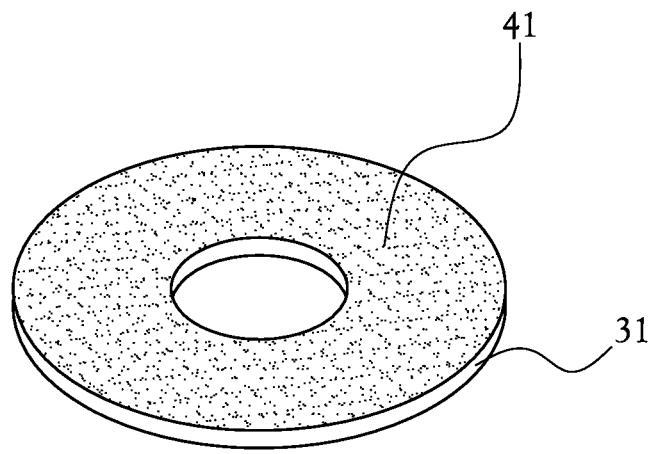
FIG. 5A is a perspective view of a disposable release liner member and attached layer of pressure-sensitive transfer adhesive material.
Figure 5B:
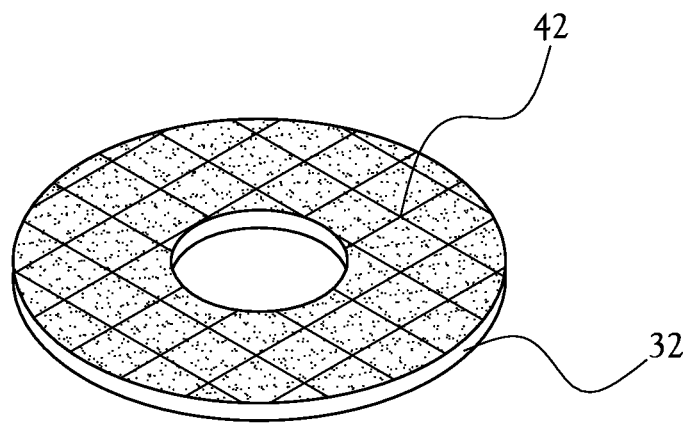
FIG. 5B is a perspective view of a disposable release liner member and attached layer of pressure-sensitive transfer adhesive material with scrim.

In some example embodiments of the present general inventive concept, such as that shown in FIG. 5A, the release liner 31 includes a layer of pressure-sensitive transfer adhesive material 41 that includes no scrim or reinforcing structure within the layer of pressure-sensitive transfer adhesive material 41 itself. In some example embodiments, such as that shown in FIG. 5B, the release liner 32 is connected to a layer of pressure-sensitive transfer adhesive material 42 that does include a scrim or other reinforcing structure within the layer of pressure-sensitive transfer adhesive material 42 itself. In these embodiments, the scrim or reinforcing structure generally comprises a fine, lightweight material worked in a criss-crossed pattern and in close contact with or surrounded by the pressure-sensitive transfer adhesive material. Generally, the criss-crossed pattern of the scrim leaves substantial apertures allowing the free through-penetration of pressure-sensitive transfer adhesive material, while still performing a reinforcing function and helping to keep the pressure-sensitive transfer adhesive material together in a single body.

In some embodiments, the pressure-sensitive transfer adhesive material is an acrylic-based pressure-sensitive pressure-sensitive transfer adhesive. In some embodiments, the pressure-sensitive transfer adhesive material is a rubber-based pressure-sensitive pressure-sensitive transfer adhesive. Those of skill in the art will recognize that other pressure-sensitive transfer adhesive materials will be suitable, and that the present general inventive concept is not limited to any particular pressure-sensitive transfer adhesive material or any single class of pressure-sensitive transfer adhesive materials.

Thus, some embodiments of the present general inventive concept include a connector assembly to join adjacent ends of insulation tubing, comprising a release liner member coated with a layer of pressure-sensitive transfer adhesive material, said release liner member having a central opening. Said release liner member transports with itself a layer of pressure-sensitive transfer adhesive material, said layer of pressure-sensitive transfer adhesive material to bond to insulation tubing. When said layer of pressure-sensitive transfer adhesive material is positioned between a first section of insulation tubing and a second section of insulation tubing, one side of said layer of pressure-sensitive transfer adhesive material bonds to the first section of insulation tubing and another side of said layer of pressure-sensitive transfer adhesive material bonds to the second section of insulation tubing.

In several embodiments, the release liner member can include a split or slit extending from the center opening to the outer edge. In some embodiments, said layer of pressure-sensitive transfer adhesive material includes a scrim to reinforce the layer of pressure-sensitive transfer adhesive material. In some embodiments, said layer of pressure-sensitive transfer adhesive material includes an acrylic-based pressure-sensitive transfer adhesive material. In some embodiments, said layer of pressure-sensitive transfer adhesive material includes a rubber-based pressure-sensitive transfer adhesive material. The present general inventive concept is not limited to any particular adhesive material or any single class of adhesive materials, and other pressure-sensitive transfer adhesive materials may be suitable in some embodiments.

Figure 7A:
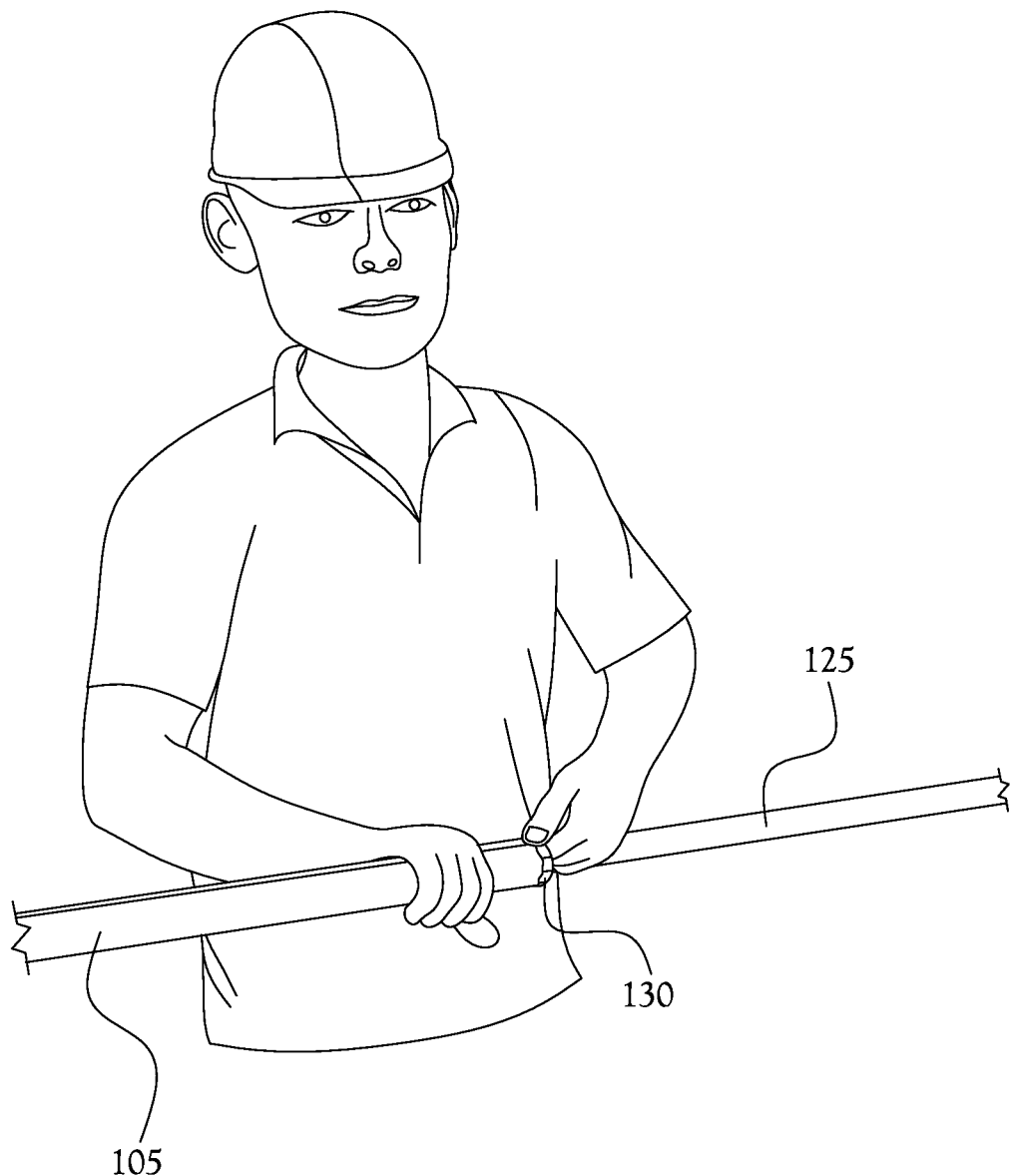
FIG. 7A is a view of an example embodiment process of applying an adhesive assembly to a section of insulation tubing on a pipe.
Figure 7B:
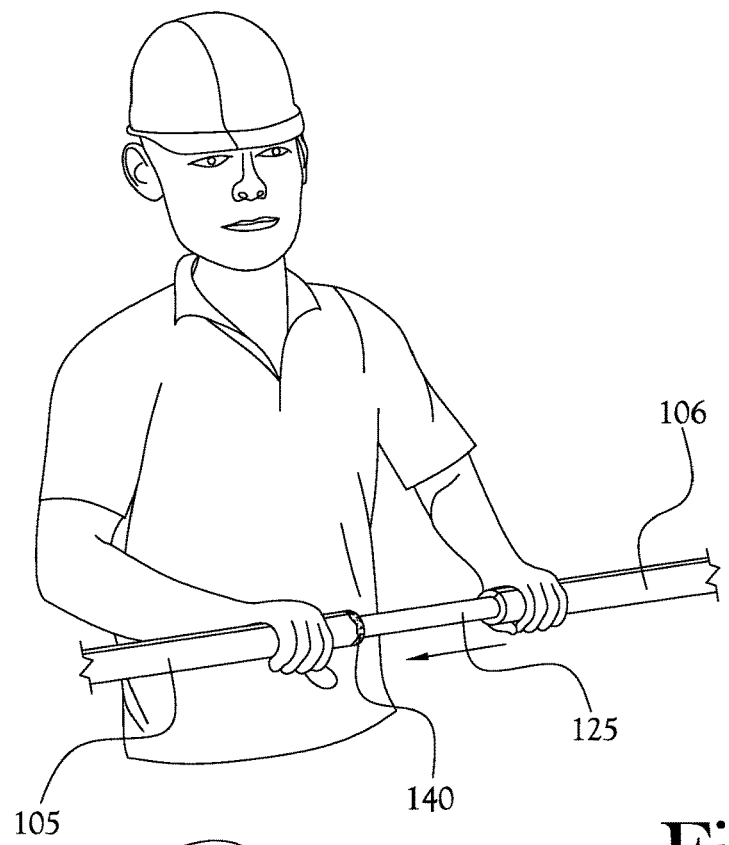
FIG. 7B is a view of another portion of the process shown in FIG. 7A, showing the installation of a second section of insulation tubing.
Figure 7C:
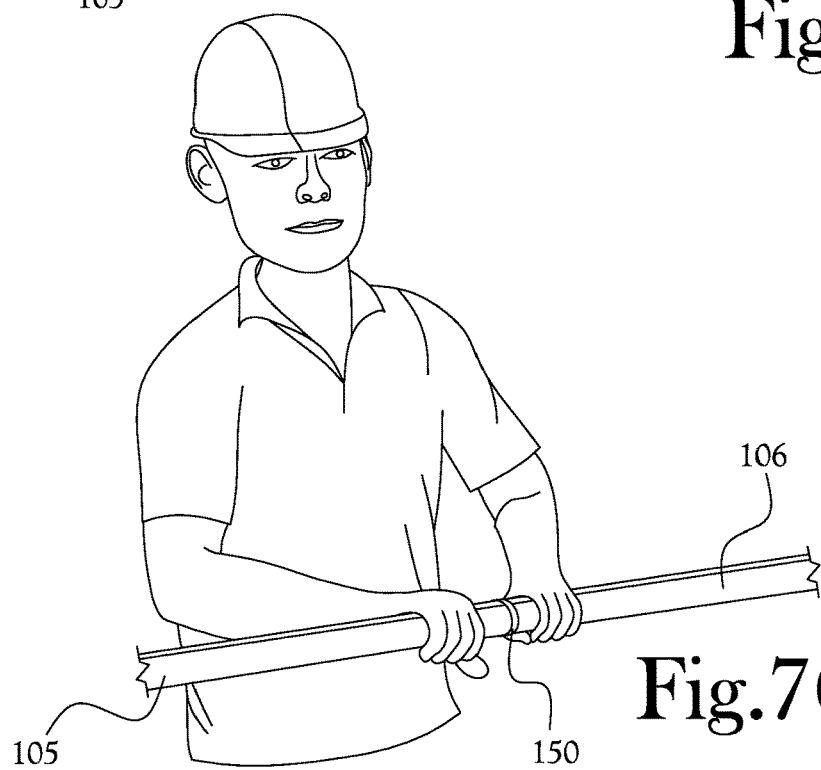
FIG. 7C is a view of another portion of the process shown in FIGS. 7A and 7B, showing the joining of the first and second sections of insulation tubing and the covering of the sections with tape.

FIGS. 6A through 7C illustrate a further example embodiment of a sealing system 100 for joining two units of insulation tubing. As shown in FIG. 6A, a first section or piece of insulation tubing 105 is fitted around a length of pipe 125. An adhesive assembly 120 comprising a release liner 130 and a layer of pressure-sensitive adhesive material 140 is positioned on the pipe 125 proximate an exposed end 115 of the insulation tubing 105; to this end, a slit or split 135 in the adhesive assembly 120, extending from the center opening of the adhesive assembly 120 to the outer edge adhesive assembly 120, facilitates the positioning of the adhesive assembly 120 on the pipe 125, such that the adhesive assembly 120 substantially wraps around the circumference of the pipe 125. The adhesive assembly 120 is aligned with the insulation tubing 105, using the pipe 125 as a guide, and the adhesive assembly 120 is pressed against the exposed end 115 of the insulation tubing 105, as shown in FIG. 6B and in FIG. 7A, so that the layer of pressure-sensitive adhesive material 140 makes contact with the exposed end 115 of the insulation tubing 105. The release liner 130 is then pulled away from the insulation tubing 105, leaving only the layer of pressure-sensitive adhesive material 140 in place, as shown in FIG. 6C. Next, as shown in FIGS. 7B and 7C, a second piece of insulation tubing 106 is fitted around the pipe 125, and the second piece of insulation tubing 106 is moved and brought into contact with the layer of pressure-sensitive adhesive material 140 already affixed to the first piece of insulation tubing 105. In this way, the first piece of insulation tubing 105 and the second piece of insulation tubing 106 are joined, with the layer of pressure-sensitive adhesive material 140 between them and adhering to both pieces of insulation tubing.

In some embodiments, the outer diameter of the adhesive assembly 120 is greater than the outer diameter of the insulation tubing 105; in such cases, the excess portion of the adhesive assembly 120 is folded over the outbound surface of the insulation tubing 105, as shown in FIG. 6B; this leaves excess pressure-sensitive adhesive material 140 on the outbound surface of the insulation tubing 105, as shown in FIG. 6C. In such cases, after the the first piece of insulation tubing 105 and the second piece of insulation tubing 106 are joined, tape 150 is applied around the seam where the two pieces of insulation tubing meet, as shown in FIG. 7C; the tape 150 covers the excess pressure-sensitive adhesive material 140. Generally, this tape 150 is at least two inches wide.

Figure 8A:
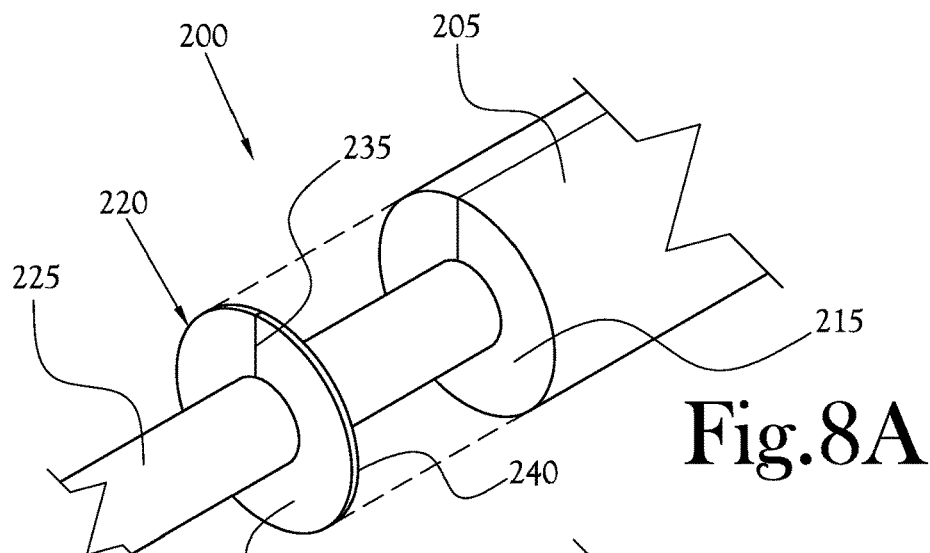
FIG. 8A is a perspective view of a further example embodiment of an adhesive assembly including a disposable release liner and a layer of pressure-sensitive transfer adhesive material, showing the adhesive assembly being positioned on a pipe.
Figure 8B:
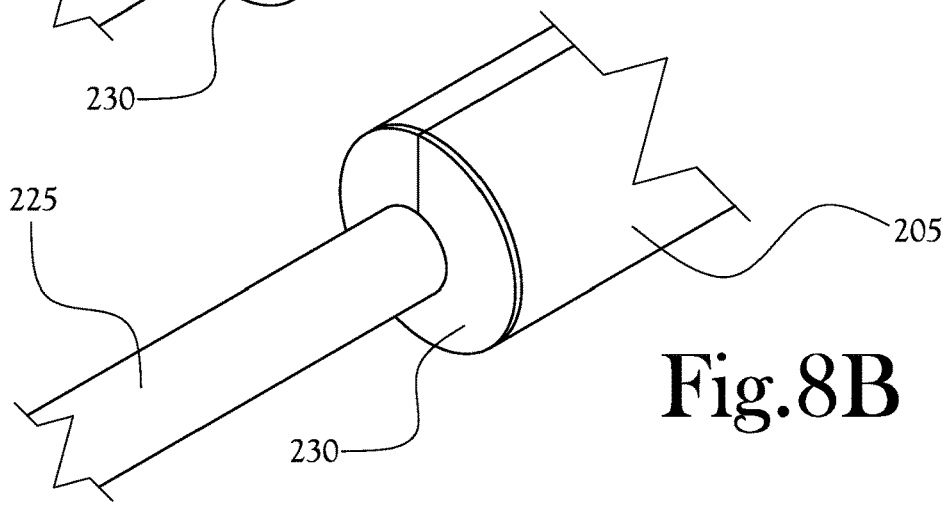
FIG. 8B is another perspective view of the example embodiment shown in FIG. 8A, showing the adhesive assembly pressed against the exposed end of a section of insulation tubing on a pipe.
Figure 8C:
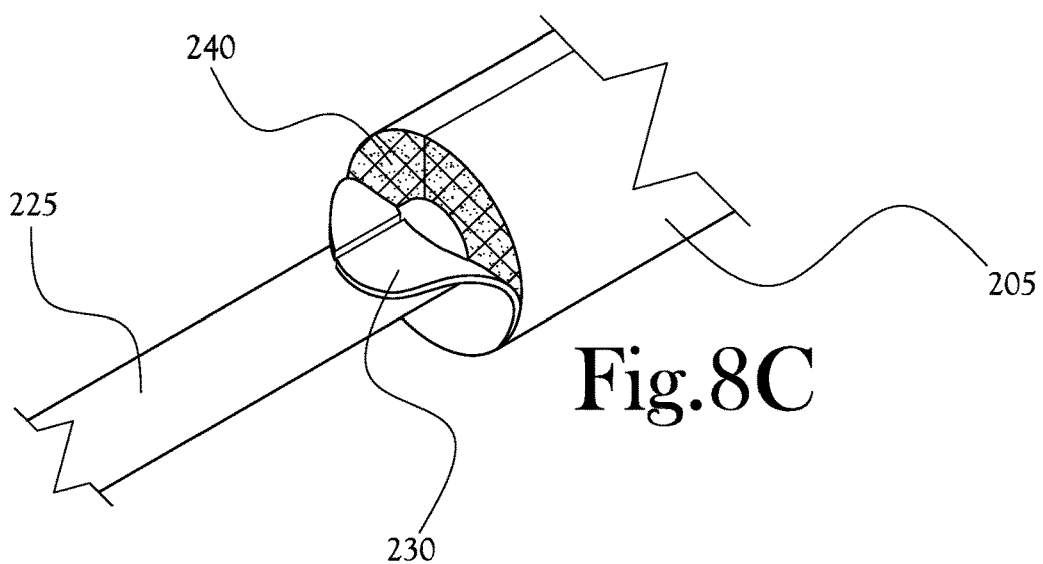
FIG. 8C is another perspective view of the example embodiment shown in FIGS. 8A and 8B, showing the pressure-sensitive transfer adhesive material on the section of insulation tubing on a pipe after the release liner has been removed.

FIGS. 6A through 7C illustrate an example embodiment in which the outer diameter of the adhesive assembly 120 is greater than the outer diameter of the insulation tubing 105. It is also possible, in some example embodiments, to have an adhesive assembly 220 in which the outer diameter of the adhesive assembly 220 is substantially the same as the outer diameter of the insulation tubing 205; on such example embodiment is shown in FIGS. 8A through 8C. The application and use of this example embodiment system 200 is substantially similar to the application and use of the system 100 shown in FIGS. 6A through 7C. An adhesive assembly 220 comprising a release liner 230 and a layer of pressure-sensitive adhesive material 240 is positioned on the pipe 225 proximate an exposed end 215 of the insulation tubing 205; to this end, a slit or split 235 in the adhesive assembly 220, extending from the center opening of the adhesive assembly 220 to the outer edge adhesive assembly 220, facilitates the positioning of the adhesive assembly 220 on the pipe 225, such that the adhesive assembly 220 substantially wraps around the circumference of the pipe 225. The adhesive assembly 220 is aligned with the insulation tubing 205, using the pipe 225 as a guide, and the adhesive assembly 220 is pressed against the exposed end 215 of the insulation tubing 205, as shown in FIG. 8B. The release liner 230 is pulled away from the insulation tubing 205, leaving the layer of pressure-sensitive adhesive material 240 in place, as shown in FIG. 8C. Next, a second piece of insulation tubing is fitted around the pipe, and the second piece of insulation tubing is moved and brought into contact with the layer of pressure-sensitive adhesive material 240 already affixed to the first piece of insulation tubing 205. In this way, the first piece of insulation tubing and the second piece of insulation tubing are joined, with the layer of pressure-sensitive adhesive material between them and adhering to both pieces of insulation tubing. In this embodiment, too, tape may be applied around the seam where the two pieces of insulation tubing meet, although there is substantially no adhesive material on the outboard surface of the insulation tubing.

In some embodiments, the components of the adhesive assembly, along with other tools and/or materials to apply and use the adhesive assembly, are provided in a kit or carton. In one such example embodiment, inside the kit or carton is a tape squeegee and a single stack of adhesive assemblies sized for the internal diameter and wall thickness of the insulation tubing at hand. Generally, the stack of adhesive assemblies is mounted on a thin non-adhesive disc that allows a user to hold the stack in hand or conveniently keep it in pocket. To complete the installation, a tape measure, a knife, a pair of scissors, a tape applicator tool or tape squeegee, a sharpening stone and appropriate safety equipment are sometimes requires. Tape is a component of this closure system.

To start, a section of insulation tubing is applies to a pipe. Next, an adhesive assembly is removed from the stack; it should come off just like a stickie note. A user opens the factory-made split in the on the adhesive assembly and then slips adhesive assembly over the piping. Using the pipe as a guide, the user properly aligns the adhesive assembly with the insulation and then presses the exposed adhesive side of the adhesive assembly to the installed insulation. (Generally, each adhesive assembly is designed to work with at least two thicknesses of insulation.) When using adhesive assembly with a thinner wall, it is normal to have some excessive adhesive around the outside diameter of the insulation sections; a user simply folds the excess onto the outside diameter of the pipe insulation before continuing.

The next section of insulation tubing is installed over the pipe. Then, the release liner is removed from the exposed side of the adhesive assembly, and then the next section of insulation tubing is pressed against the adhesive material with sufficient pressure to make a bond between the adhesive and both sections of insulation tubing. The insulation should be installed with a slight amount of compression at each joint to insure a proper seal. The insulation is allowed it to relax before installation of tape over the seam. To install the tape, a user determines the total outside diameter of the pipe insulation being applied and then measures and cuts a strip of tape to length, generally adding a minimum of two inches to insure the required amount of overlap. The user applies the strip of tape around the circumferential butt seam on the top of the adhesive material. Generally, the tape is placed so that the width is evenly divided across both sides of the butt joint.

In various example embodiments, the present general inventive concept provides a method of bonding two insulation sleeves that is simpler compared to methods and assemblies known in the art. Compared to previous options, example embodiments of the present general inventive are thinner—that is, there is only the layer of pressure-sensitive transfer adhesive remaining between the sleeves once fully applied. This thinness eliminates need for additional insulation by eliminating gaps between the insulation sleeves that are being bonded.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A method of applying a pressure-sensitive transfer adhesive for connecting adjacent ends of insulation tubing, comprising:

fitting a first section of insulation tubing to a pipe, said first section of insulation tubing having an exposed end and an outbound surface substantially adjacent the exposed end;

peeling a first adhesive assembly away from a stack of adhesive assemblies, said first adhesive assembly including a release liner member contacting a layer of pressure-sensitive transfer adhesive, said first adhesive assembly having an outer diameter greater than an outer diameter of the exposed end of the first section of insulation tubing;

attaching said first adhesive assembly to the exposed end of the first section of insulation tubing and covering the exposed end of the first section of insulation tubing and a portion of the outbound surface of the first section of insulation tubing;

pulling the release liner member away from the adhesive on said first section of insulation tubing, whereby said layer of pressure-sensitive transfer adhesive remains attached to the exposed end of the first section of the insulation tubing and to the portion of the outbound surface of the first section of insulation tubing;

fitting a second section of insulation tubing to the pipe and bringing an exposed end portion of the second section of insulation tubing into contact with said layer of pressure-sensitive transfer adhesive attached to the first section of insulation tubing, whereby a seam is formed where the first section of insulation tubing is proximate the second section of insulation tubing; and covering the seam with tape such that the tape covers some of the pressure-sensitive transfer adhesive attached to the portion of the outbound surface of the first section of insulation tubing.

2. The method of claim 1 wherein said layer of pressure-sensitive transfer adhesive includes a scrim to reinforce the layer of pressure-sensitive transfer adhesive.

3. The method of claim 1 wherein said layer of pressure-sensitive transfer adhesive includes an acrylic-based pressure-sensitive transfer adhesive material.

4. The method of claim 1 wherein said layer of pressure-sensitive transfer adhesive includes a rubber-based pressure-sensitive transfer adhesive material.

* * * * *